May 10, 1955 F. L. LE BUS, SR 2,708,080
HOISTING DRUM

Filed May 26, 1952 2 Sheets-Sheet 1

INVENTOR.
FRANKLYN L. LeBus, SR.
BY
ATTORNEY

May 10, 1955   F. L. LE BUS, SR   2,708,080
HOISTING DRUM

Filed May 26, 1952   2 Sheets-Sheet 2

INVENTOR.
FRANKLYN L. LE BUS, SR.
BY
P. M. McKnight
ATTORNEY 2,708,080
HOISTING DRUM Franklyn L. Le Bus, Sr., Longview, Tex.

Application May 26, 1952, Serial No. 290,009

8 Claims. (Cl. 242—117)

This invention relates to improvements in hoisting drums or spools for receiving steel cable, rope, electric lines and the like.

It is well known that a cable or the like being wound onto a spool should be wound in a uniform manner to prevent the cable from becoming entangled and damaged. The most common method of controlling the winding of cables is either machining grooves in the outer periphery of the drum core or securing suitable grooved bars on the outer periphery of the drum core. The grooves are usually provided in a continuous helix, i. e., in the manner of threads on a bolt, over the entire transverse length of the drum core to guide the first layer of cable onto the drum in a continuous helical path. A suitable guide is placed at one end of the drum core to initiate the second layer of the cable in a reversed helical path.

The first wind in the second layer will be initially forced in a reverse helical angle a short distance to cross over one wind of the cable in the first layer. The first wind of the second layer will then follow the groove between two winds of the first layer in the forward helical path. Subsequently, the first wind of the second layer will cross over another wind of the first layer in a reversed direction before the wind is completed. Each subsequent wind of the second layer will be wound in a similar manner, that is, each wind will cross over two winds of the first layer in two separate reversing movements. It will be readily appreciated that when the cable is wound onto a drum under an extremely high tension, the taut cable will resist all reversing movements during the winding operation, and the greater the number of reversing movements, the more likely it will be that the cable will become chafed and worn. Also, voids will frequently occur between adjacent winds of the second layer to cause entanglement of the cable during the winding and unwinding of the third and subsequent layers.

The present invention contemplates a novel drum for receiving and dispensing steel cable and the like wherein the cable is wound onto the drum core in a combination helical and parallel path. During each wind, the cable is guided in a helical or oblique path for only a portion of the perimeter of the drum core, and is then guided in a path parallel to the drum flanges for the remainder of the wind. In this manner, each wind of the second and subsequent layers crosses only one wind of the previous layer and then follows a groove provided between two winds of the previous layer. The reversing movements of the cable are thereby reduced to a minimum. Furthermore, the obliquely disposed portion of each wind of cable in the first layer is gradually curved to facilitate the winding of the cable and diminish wear of the cable. In addition, this invention contemplates novel end fillers or guides adjacent the flanges of the drum and kickers on the drum flanges to locate and direct the cross overs between the successive layers at the desired circumferential position.

An important object of this invention is to provide a novel drum for winding steel cable and the like in a combination helical and parallel path. Also, to reduce the abrupt bending of the cable to a minimum as the cable is being wound on the drum, and particularly the first layer of cable wound on the drum.

Another object of this invention is to materially increase the service life of cable frequently wound and unwound from a drum.

A further object of this invention is to reduce to a minimum the reversing movements of a cable being wound on a drum core.

A still further object of this invention is to provide novel end fillers and kickers on a drum for directing the cross-overs between the successive layers of cable at predetermined circumferential positions.

Another object of this invention is to provide means for winding a cable onto a drum without voids between the adjacent winds.

Another object of this invention is to provide an efficient drum having a long service life and which may be economically manufactured.

Other objects and advantages of the invention will be evident from the following detailed description, read in conjunction with the accompanying drawings, which illustrate my invention.

Figure 1:
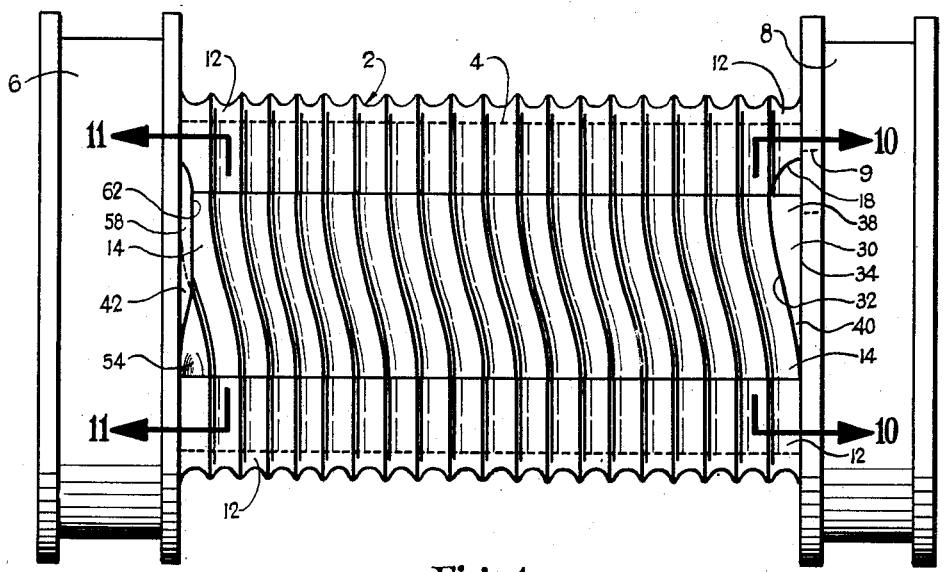
Figure 1 is a side elevational view of a novel hoisting drum, with parts removed for clarity.

Referring to the drawings in detail, and particularly Fig. 1, reference character 2 generally designates a novel hoisting drum comprising a cylindrically shaped core 4 having brake flanges 6 and 8 on the opposite ends thereof. The drum 2 is supported on suitable brackets or braces (not shown) in such a manner that it may be rotated about the longitudinal axis of the drum core 4 in the usual manner. An aperture 9 is provided in the inner side of the brake flange 8 adjacent the core 4 for receiving the dead or non-working end of the cable or the like (not shown) which is to be wound upon the drum 2.

Figure 6:
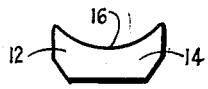
Figure 6 is a typical end view of the bars shown in Figs. 2 to 5, slightly enlarged.

A plurality of bars 12 and 14, of uniform width, are secured in end to end relation around the drum core 4. Each of the bars 12 and 14 is provided with a groove 16 in the outer periphery thereof, as clearly shown in the typical end view Fig. 6. The bars are so arranged to provide a continuous circumferential groove around the drum core 4, whereby portions of the groove are parallel to the drum flanges 6 and 8 and portions of the groove are disposed at an angle to the drum flanges. Two of the bars 12 and one bar 14 are required to extend completely around the core 4 one time.

Figure 2:
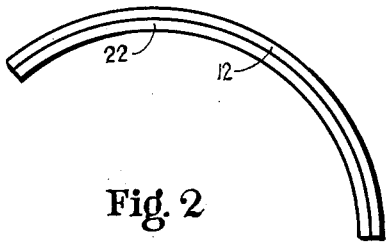
Figure 2 is a side elevational view of one type of grooved bar used on the hoisting drum shown in Fig. 1.
Figure 3:
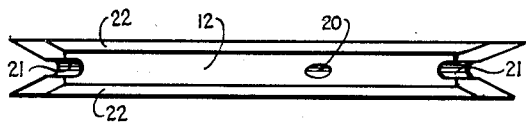
Figure 3 is a bottom view of the grooved bar shown in Fig. 2.

The bars 12 are formed on the arc of a circle (see Fig. 2) to conform to the outer periphery of the core 4 and are straight, length-wise, to form the parallel portions of the aforementioned continuous groove. One of the bars 12 is secured to the upper portion of the core 4 (with the drum 2 in the position shown in Fig. 1) adjacent the flange 8 with one end of the bar disposed opposite the aperture 9. The end of this upper bar 12, which is next to the aperture 9, is cut away, as at 18, to facilitate the winding of a cable or the like, as will be hereinafter set forth. Another bar 12 is secured in end to end contacting relation (on the opposite side of the core 4 from that shown in Fig. 1) with the opposite end of the first mentioned upper bar 12 and extends around the lower portion of the core 4 to a point below the aperture 9. The remaining bars 12 are secured to the upper and lower portions of the core 4 in a similar relation. Therefore, all of the upper bars 12 will be in alignment, and all of the lower bars 12 will be in alignment, along the length of the core 4. An aperture 20 (see Fig. 3) is provided in the central portion and slots 21 are provided in each end of each bar 12 to facilitate the welding thereof to the drum core 4. In addition, a chamfer 22 is provided between each side of each bar 12 and the inner periphery thereof to facilitate the assembly of the bars 12 on the core 4.

Figure 4:
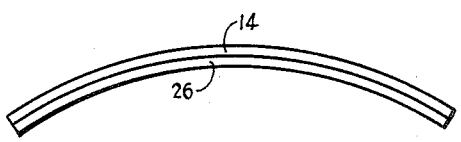
Figure 4 is a side elevational view of another type of grooved bar used on the hoisting drum shown in Fig. 1.

The bars 14 are also formed on the arc of a circle (see Fig. 4) to conform to the outer surface of the drum core 4 and are of a length to fit on the remaining exposed periphery of the core 4 between the spaced ends of the bars 12. In addition, the bars 14 are bent transversely a distance equal to the width thereof. Therefore, the groove 16 of one of the bars 14 will mate with the groove 16 of the lower bar 12, which is disposed next to the brake flange 8, with the groove 16 of the upper bar 12 located second from the flange 8. The remaining bars 14 interconnect the remaining upper and lower bars 12 in a similar manner throughout the remaining length of the drum core 4. Thus, the grooves 16 of the bars 12 and 14 form a continuous groove around the core 4 throughout the length thereof.

Figure 5:
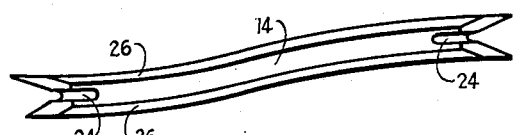
Figure 5 is a bottom view of the bar shown in Fig. 4.

As will be apparent from the drawings, Figs. 1 and 5, each bar 14 is bent transversely in such a manner to eliminate any abrupt changes in direction of the groove 16 thereof. The upper end portion of each bar 14 is straight for disposal parallel to the drum flanges 6 and 8 and the bars 12. Below the straight portion, each bar 14 is formed on a curve in a direction transverse to the longitudinal center line of the bar and is then formed on a curve in the opposite direction to position the lower end portion of the bar in a direction parallel to the upper end portion thereof. Thus, the configuration of each bar 14 (when viewed in plan) resembles what is commonly called a slow or flat S-curve with the curved portions formed on the largest possible radius to obtain the desired off-set of the opposite ends of the bar, considering, of course, the length of the bar. As will more clearly hereinafter appear, the length of each bar 14 is preferably as short as is practically possible and is preferably less than one-half the circumference of the core 4. In the embodiment shown, the bars 14 extend approximately fifteen to twenty percent of the distance around the core 4. Slots 24 are provided in each end of each bar 14 to facilitate the welding thereof to the drum core 4. In addition, a chamfer 26 is provided between each side of each bar 14 and the inner periphery thereof to facilitate the assembly of the bars 14 on the core 4.

Figure 7:
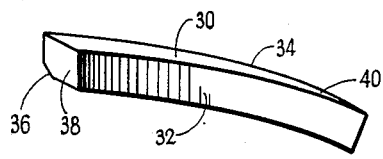
Figure 7 is a perspective view of one of the end filler pieces used on the drum shown in Fig. 1.
Figure 10:
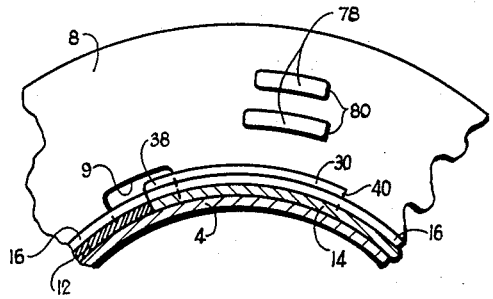
Figure 10 is a sectional view taken along lines 10—10 of Fig. 1 illustrating parts omitted from Fig. 1.

An arcuately shaped filler piece 30 (Figs. 1 and 7), sometimes hereinafter designated the starting end filler, is secured to the drum core 4 between the brake flange 8 and the adjacent grooved bar 14. The inner face 32 of the starting end filler 30 is curved to conform to the transverse curvature of the bars 14, and the outer face 34 is flat to conform to the flat inner side of the brake flange 8. A small chamfer 36 is provided between the outer face 34 and the inner periphery of the filler 30 to facilitate the fitting of the filler onto the core 4 in contact with the flange 8, particularly when the flange 8 is welded (not shown) onto the core 4. The upper large end 38 of the filler 30 is positioned conterminous with the upper ends of the bars 14 and the lower small end 40 of the filler 30 is positioned at the upper end of the lowest straight portion of the adjacent bar 14 as is clearly shown in Fig. 1. The filler 30 is slightly thicker than the bars 14 to extend a short distance above the bars 14 as shown in Fig. 10 for purposes as will be hereinafter set forth.

Figure 9:
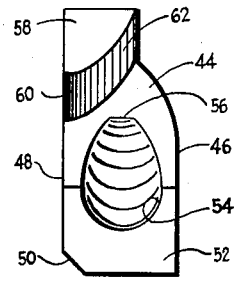
Figure 9 is an enlarged end view of the filler piece shown in Fig. 8.
Figure 8:
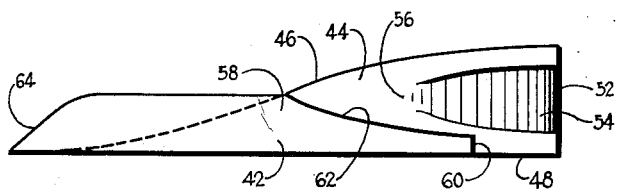
Figure 8 is an enlarged plan view of the opposite end filler piece used on the drum shown in Fig. 1.

A combination reversing and filler piece 42 (Figs. 1, 8 and 9), sometimes hereinafter called the reversing end filler, is secured to the drum core 4 between the brake flange 6 and the adjacent bar 14. The reversing end filler 42 comprises a generally wedge shaped body 44 having its inner face 46 curved to conform to the transverse curvature of the bars 14, and its outer face 48 flat to conform to the inner face of the brake flange 6. A small chamfer 50 is provided between the side face 48 and the inner periphery of the body 44. The large end 52 of the body 44 is disposed conterminous with the lower ends of the bars 14 and has a diminishing groove 54 therein adapted to communicate with the groove 16 of the adjacent bar 12. The depth of the groove 54 diminishes along the length of the body 44 and terminates at 56 above the height of the bars 14 for purposes as will be hereinafter set forth.

A vertical flange 58 is provided on the top of the body 44 conterminous with the outer face 48 thereof. The lower end 60 of the flange 58 is positioned in proximity with the end 56 of the groove 54. The inner face 62 of the flange 58 is curved slightly inward toward the bars 14 from the end 60 thereof to guide a cable lying on the body 44 as will be hereinafter set forth. The inner face 62 extends inwardly to a position approximately media way of the filler 42 substantially in line with the center line of the groove 54 and then extends parallel with the side face 48 of the body 44 to the upper end 64 of the flange 58. The upper end of the face 62 is beveled to eliminate all sharp edges and prevent chafing of a cable being unwound from the drum 2.

Figure 12:
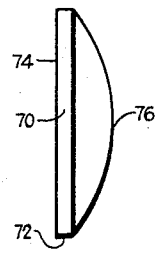
Figure 12 is an enlarged typical plan view of the kickers used on one of the flanges of the drum shown in Fig. 1.
Figure 13:
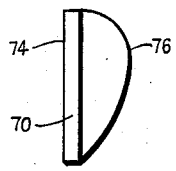
Figure 13 is an end view of the kickers shown in Fig. 12.
Figure 11:
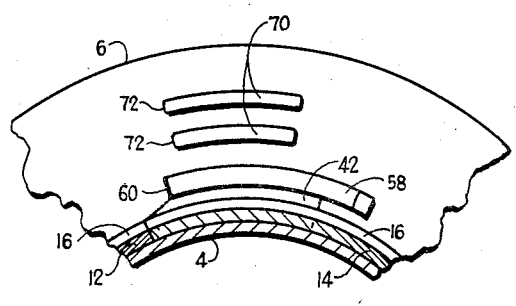
Figure 11 is a sectional view taken along lines 11—11 of Fig. 1, also illustrating parts omitted from Fig. 1.

A pair of arcuately shaped kickers 70 (see Figs. 11, 12, and 13) are secured in spaced relation to the inner face of the brake flange 6 radially outward of the end filler 42. The lower ends 72 of the kickers 70 are substantially radially aligned with the lower end 60 of the filler flange 58. The outer face 74 of each kicker 70 is flat to conform to the inner face of the brake flange 6, whereas, the inner face 76 is tapered longitudinally to converge toward the opposite ends of the kicker. In addition, the inner face 76 is curved or rounded in a vertical direction as indicated in Fig. 13. Therefore, the kickers 70 will cause a cable or the like, which comes into contact therewith, to bend gradually and minimize the possibility of chafing the cable.

A pair of arcuately shaped kickers 78 (Fig. 10) are also secured in spaced relation on the inner side face of the brake flange 8 opposite the starting end filler 30. The lower ends 80 of the kickers 78 are substantially radially aligned with the lower end 40 of the filler 30. The kickers 78 are constructed in the same manner as the kickers 70 previously described.

*Operation*

To wind a cable or the like (not shown) onto the drum 2, one end of the cable is secured in the aperture 9 of the brake flange 8 and the remainder of the cable is held, preferably under tension, in a direction transverse to the longitudinal center line of the drum 2. The drum 2 is then rotated in a counter-clockwise direction (referring to the outer face of the brake flange 8) about the longitudinal center line of the core 4 by any suitable machinery (not shown). During the first turn of the drum 2, the cable will be guided in the grooves 16 of the bars 12 disposed adjacent the flange 8. Near the completion of the first turn of the drum 2, the cable will enter the groove 16 of the first bar 14 at the lower end thereof. It will be apparent that as the cable is received or seated in the groove 16 of the first bar 14, it will be bent to the left, as shown in Fig. 1, to be in alignment with the second pair of bars 12. Furthermore, the cable will be gradually bent as it moves into the first bar 14 to minimize the reversing movement of the cable and facilitate the winding thereof. Since the starting end filler 30 is slightly higher than the bars 14, the cable will be assuredly guided into the first bar 14.

As the drum 2 is continued rotating, the cable is alternatively received in the bars 12 and the bars 14 to guide the cable in a combination parallel and substantially helical path over the length of the core 4. It will be noted that the angled portion of each wind of the cable in the first layer will be disposed in the same circumferential position on the periphery of the core 4. As the last wind of the first layer is completed, the cable enters the groove 54 in the lower end of 52 of the reversing end filler 42, whereupon the cable is raised onto the top of the filler body portion 44. When the cable reaches this position, the tapered face 62 of the flange 58 directs the cable in a reverse direction toward the brake flange 8. Since the tapered face 62 extends to a position substantially in line with the center line of the groove 54, the cable will be forced away from the brake flange 6 to a position in line with the groove provided by the parallel sections of the last two winds of the first layer. The cable will be received in this groove during the major portion of the second wind in the second layer. As this second wind is being completed, the cable will contact the angled portion of the first wind of the second layer and be guided into the next adjacent parallel groove provided by the winds of the first layer.

The remaining winds of the second layer will be guided in a similar manner to cause a progression of the cable across the drum 2 toward the brake flange 8. It will be noted that since the reversing end filler 42 is in alignment with the bars 14, the angled portions of the second layer of cable will be disposed directly above the angled portions of the first layer. Thus, the parallel grooves provided by the parallel portions of the winds in the first layer will be utilized to the maximum degree in guiding the winds of the second layer to reduce the possibility of the cable becoming entangled and damaged. As the last wind of the second layer is completed, the cable will contact the inner face of the flange 8 and will be raised by the angled portion of the next to last wind. However, the cable will be raised during the passage thereof underneath the innermost kicker 78. When the cable is raised, the first wind of the third layer will be begun. As this first wind is being completed, the cable will contact the innermost kicker 78 and be forced inwardly away from the flange 8 to provide the angled portion of this wind. The second wind of the third layer will be disposed in the parallel groove provided by the parallel portions of the last two winds in the second layer until the wind is substantially completed. At this time, the cable will contact the angled portion of the first wind in the third layer and be guided in a similar direction toward the flange 6. The remaining winds in the third layer will be guided in a similar manner to cause a progression of the cable across the core 4.

The last wind of the third layer will be in contact with the brake flange 6 until the wind is substantially completed. As the cable of this last wind reaches the angled portion of the next to last wind, it will be forced upwardly by said angled portion and will simultaneously be forced in a reverse direction away from the flange 6 by the innermost kicker 70. This kicker 70 will force the cable to a position where it will enter the parallel groove provided between the parallel portions of the last two winds in the third layer to begin the first wind of the fourth layer of cable.

The second wind of the fourth layer will be forced toward the brake flange 8 by the angled portion of the first wind and the remaining winds will be guided in a similar manner to cause a progression of the cable across the core 4. It will be apparent that the outermost kickers 78 and 70 will function in a manner similar to that previously described for the innermost kickers 78 and 70 to reverse the direction of the cable as the fourth and fifth layers are completed. Thus, the cable will be wound on the drum 2 in a uniform manner, whereby the angled portions of each wind of each layer will be disposed in the same zone or circumferential position. This feature permits the major portion of each wind of the cable to be disposed in a direction parallel to the drum flanges, thereby minimizing the possibility of the cable forcing itself between two winds of an inner layer and causing chafing of the cable. The kickers 70 and 78 prevent the cable from becoming wedged between the angled portion of the last wind in any layer and either of the brake flanges 6 or 8. Before the cable can become thus wedged, the kickers operate to force the cable in a reverse direction away from the respective brake flange. The area of the drum 2 covered by the bars 14 and the end fillers 30 and 42 may be defined as a control zone, since all reversing movements of the cable take place in this area.

From the foregoing, it is apparent that the present invention provides a novel cable winding apparatus wherein a cable will be wound onto the drum in a path partially parallel to the drum flanges and partially at an angle to the drum flanges. The path of the cable may be generally described as a combination helical and parallel path. The grooved bars, which control the path of winding of the first layer of cable, reduce the reversing movements of the cable to a minimum and completely eliminate any abrupt bending of the cable. It is also apparent that the present invention provides a novel cable winding apparatus for winding cable in a combination helical and parallel path wherein the helical or angled portions of each wind in each layer of cable will be disposed in the same zone or circumferential position.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A cable winding apparatus, comprising a cylindrical drum core having flanges on the opposite ends thereof, a plurality of arcuate bars secured in end to end relation around the drum core between the flanges, said bars having grooves in the outer periphery thereof to form a continuous groove for receiving a cable, a portion of said bars forming a control zone extending over a portion of the drum core periphery throughout the length of the drum core, the bars in said control zone being curved to cause a progression of a cable across the drum core in one direction as the cable is being wound in said continuous groove, the remaining bars being straight and disposed parallel to the drum flanges.

2. A cable winding apparatus, comprising a cylindrical drum core having flanges on the opposite ends thereof, a plurality of arcuate bars secured in end to end relation around the drum core between the flanges, said bars having grooves in the outer periphery thereof to form a continuous groove for receiving a cable, a portion of said bars forming a control zone extending over a portion of the drum core periphery throughout the length of the drum core, the bars in said control zone being curved in the form of a slow S-curve to cause a progression of a cable across the drum core in one direction as the cable is being wound in said continuous groove, the remaining bars being straight and disposed parallel to the drum flanges, and filler pieces on the drum core at each end of said control zone, one of said filler pieces having a tapered flange to direct the cable in a reverse direction when a layer of cable has been applied to the drum core.

3. A cable winding apparatus, comprising a cylindrical drum core having flanges on the opposite ends thereof, bar means on the outer periphery of said core providing a continuous winding groove around the core throughout the length thereof to receive a cable, a portion of each circumference of said groove being curved to provide a progression of the cable over the length of the drum core, said curved portions being in the same circumferential position on the drum core and providing a control zone, the remaining portion of each circumference of said groove being parallel to the drum flanges, a filler piece on the drum core at one end of said control zone to direct the first wind of a second layer of cable being wound on the drum core in a reverse direction, and radially spaced kickers secured to the drum flanges in alignment with said control zone to reverse the direction of the first wind of each successive layer of cable being wound on the drum core.

4. A cable winding apparatus, comprising a cylindrical drum core having flanges on the opposite ends thereof, a plurality of arcuate bars secured in end to end relation around the drum core between the flanges, said bars having grooves in the outer periphery thereof to form a continuous groove for receiving a cable, a portion of said bars forming a control zone extending over a portion of the drum core periphery throughout the length of the drum core, the bars in said control zone being curved in the form of a slow S-curve to cause a progression of a cable across the drum core in one direction as the cable is being wound in said continuous groove, the remaining bars being straight and disposed parallel to the drum flanges, said continuous groove providing a seat to receive the first layer of cable being wound on the drum core, a filler piece on the drum core at one end of said control zone, said filler piece having a diminishing groove in one end thereof to receive and raise the cable as the first layer is completed, said filler piece also having a tapered shoulder to direct the raised cable in a reverse direction and initiate the second layer of cable on the drum core, and a plurality of kickers secured in radial spaced relation on each drum flange in alignment with said control zone to reverse the direction of the first wind of each successive layer of cable wound on the drum core.

5. A cable winding apparatus, comprising a cylindrical drum core having flanges on the opposite ends thereof, a plurality of arcuate bars secured in end to end relation around the drum core between the flanges, said bars having grooves in the outer periphery thereof to form a continuous groove for receiving a cable, a portion of said bars forming a control zone extending over a portion of the drum core periphery throughout the length of the drum core, the bars in said control zone being curved in the form of a slow S-curve to cause a progression of a cable across the drum core in one direction as the cable is being wound in said continuous groove, the remaining bars being straight and disposed parallel to the drum flanges, filler pieces on the drum core at each end of said control zone, one of said filler pieces having a tapered flange to direct the cable in a reverse direction when a layer of cable has been applied to the drum core, and kickers secured in radial spaced relation on each drum flange to control the winding of successive layers of cable on the drum core.

6. A cable winding apparatus, comprising a cylindrical drum core having flanges on the opposite ends thereof, a plurality of arcuate bars secured in end to end relation around the drum core between the flanges, said bars having grooves in the outer periphery thereof to form a continuous groove for receiving a cable, a portion of said bars forming a control zone extending over a portion of the drum core periphery throughout the length of the drum core, one end of each bar in said control zone being straight and parallel to the drum flanges, the remaining portion of each of said bars in said control zone being curved transversely in one direction and then in the opposite direction on the largest possible radius, whereby the lower end portion of each of said bars in said control zone is offset from the upper end thereof and is parallel to the drum flanges, the remaining bars being straight and disposed parallel to the drum flanges, filler pieces on the drum core at each end of said control zone, one of said filler pieces having a tapered flange to direct the cable in a reverse direction when a layer of cable has been applied to the drum core, and kickers secured in radial spaced relation on each drum flange to control the winding of successive layers of cable on the drum core.

7. In a cable winding apparatus comprising a cylindrical drum core having brake flanges at the opposite ends thereof, means on the outer periphery of the drum to provide a continuous winding groove around the core throughout the length thereof for receiving a cable, and means cooperating with the first mentioned means to provide controlled progressive spooling of a plurality of layers of cable.

8. In a method of spooling a plurality of wraps of cable on a drum core, which consists of winding a greater portion of each layer of cable circumferentially on the core in a parallel path, bending the remaining portion of each layer of cable in a helical path throughout the transverse length of the layer of cable in order to provide controlled progressive spooling for the subsequent layers of the cable spooled thereon.

References Cited in the file of this patent

UNITED STATES PATENTS

| | | |
|---|---|---|
| 2,204,938 | Le Bus | June 18, 1940 |
| 2,216,819 | Le Bus | Oct. 8, 1940 |
| 2,599,926 | Le Bus | Jan. 10, 1952 |
| 2,620,996 | Le Bus | Dec. 9, 1952 |